July 14, 1942.  W. R. BROWN ET AL  2,289,624
ROTARY SHAFT AND BEARING ASSEMBLY
Filed July 29, 1940
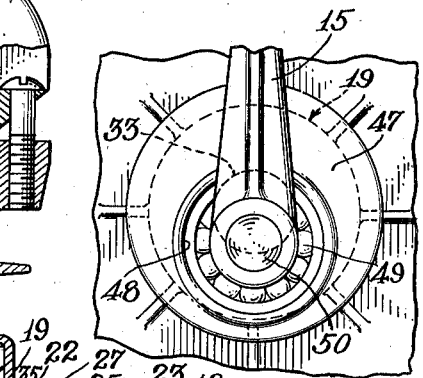
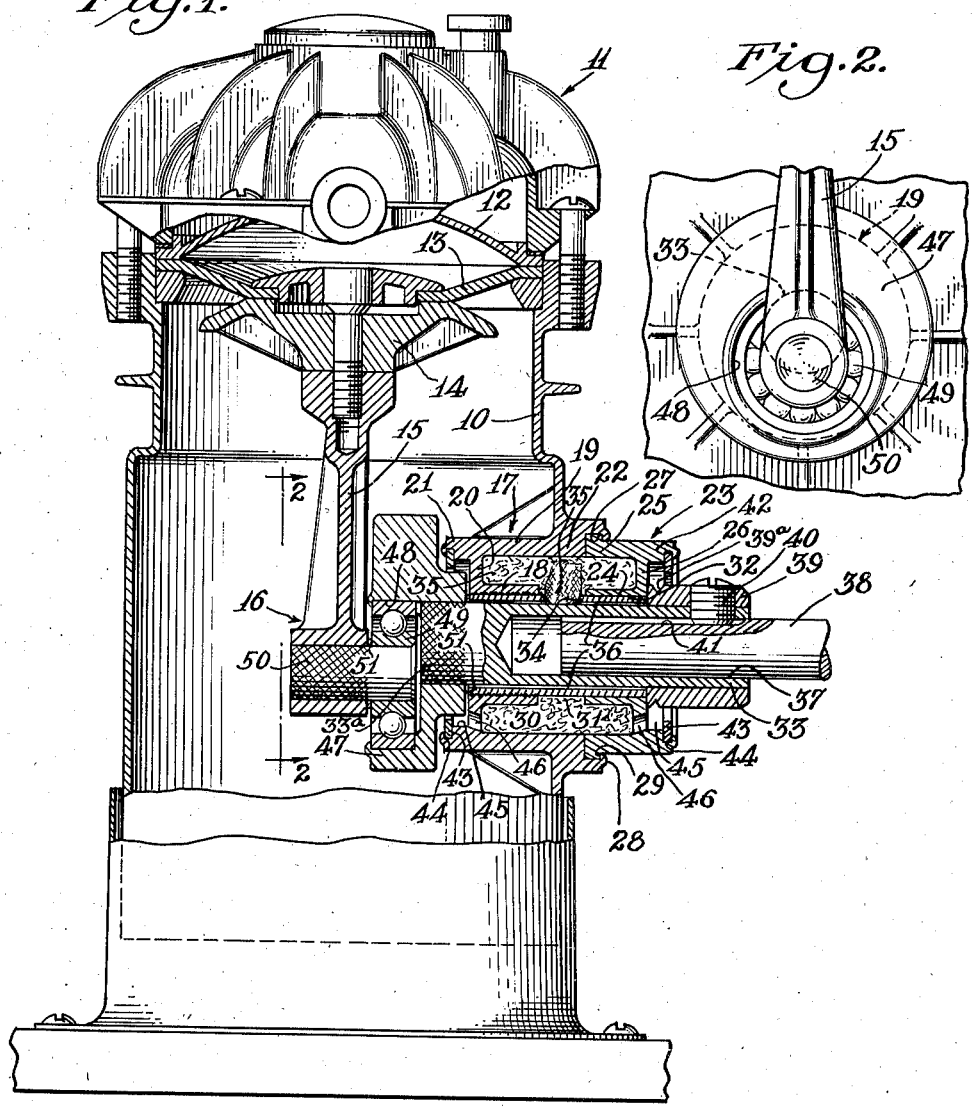
Inventors
William R. Brown
Nigel J. Collings
BY Parker, Carlson, Pitzner & Hubbard
Attorneys.

Patented July 14, 1942

2,289,624

UNITED STATES PATENT OFFICE 2,289,624

ROTARY SHAFT AND BEARING ASSEMBLY

William R. Brown, Chicago, and Nigel J. Collings, Elmhurst, Ill., assignors to W. R. Brown Corporation, Chicago, Ill., a corporation of Illinois Application July 29, 1940, Serial No. 348,262

4 Claims. (Cl. 308—132)

The invention relates to rotary shaft and bearing assemblies and more particularly to an assembly of this nature which is especially well adapted for use with, or as an integral part of, die-cast members such, for example, as the die-cast casing of the diaphragm-type compressor covered by our copending application Serial No. 348,263, filed July 29, 1940.

An object of the invention, generally stated, is to provide a new and improved shaft and bearing assembly which is simple and inexpensive to construct and in which a number of parts may be die castings.

Another object is to provide a new and improved assembly of this nature which includes interfitting die-cast sections arranged to support a simple sleeve bushing and fashioned to enclose a reservoir for supplying lubricant to the relatively rotating parts.

Another object is to provide a novel assembly of this nature embodying a plurality of supporting and operating elements integrated by die casting with the members supported and operated thereby to produce an assembly that may be easily assembled and is economical.

Other objects and advantages will become apparent in the following description and from the accompanying drawing, in which:

Figure 1 is an axial sectional view through a compressor which includes a shaft and bearing assembly embodying the features of the invention.

Fig. 2 is an end view of the assembly looking from the line 2—2 of Fig. 1 in the direction indicated by the arrows.

For illustrative purposes, a rotary shaft and bearing assembly embodying the present invention has been shown in connection with a diaphragm-type compressor unit. Briefly described, the unit includes a casing 10 which may be die cast and supports a head structure 11. The casing and head enclose the operative elements of the unit which include a fixed diaphragm 12, and a relatively movable flexible diaphragm 13 which is reciprocated toward and away from the fixed diaphragm by a piston and pull plate assembly 14. A connecting rod 15 derives motion from a crank, designated generally at 16, for driving the piston and pull plate assembly.

Referring to the bearing structure, in which the rotary elements for driving the crank 16 are journaled, the casing 10 has cast integrally therewith a transversely extending annular member 17 which is generally channel-shaped in cross section and includes radially spaced inner and outer walls 18 and 19, respectively, joined by a base wall 20. The outer wall 19 extends a short distance beyond the end wall 20, as indicated at 21, and oppositely extends beyond the edge of the wall 18, as indicated at 22. In this instance, the extension 22 passes through and beyond the end of the casing wall 10, thus disposing the extension largely on one side of the casing wall with the channel defined by the walls 18, 19 and 20 on the other side. The channel, as shown, faces axially outwardly from within the casing and may be termed the inner channel.

A second die cast member 23, having radially spaced inner and outer walls 24, 25, respectively, and an end wall 26 defining an outer channel is complementary to the inner member 17, and is arranged to be secured to the extension 22. Thus, the extension has an annular internal groove 27 in its end face to receive the end of the outer wall 25 of the member 23. The members may be suitably connected as by press fitting them together and by spinning or upsetting a marginal portion 28 of the extension 22 over a rib 29 near the end of the wall 25. The outer channel faces axially inwardly and the two channels define therebetween a lubricant chamber or reservoir 30. As shown, the inner walls 18 and 24 do not meet thereby providing an inwardly opening annular passage 31 from the reservoir.

An elongated sleeve bushing 32 is suitably secured within the inner walls 18 and 24. In this instance, the union between the supporting structure, of which the walls 18 and 24 are a part, is simply and economically effected by casting one wall (herein the wall 18) about the associated end of the bushing. Thus, the outer surface of this end of the bushing is preferably roughened or knurled and the bushing properly seated in the die as one of the preliminary steps in die casting the casing. On the integrated support and bearing structure, the second die cast member 23 is assembled as mentioned above, the inner wall 24 being secured to the outer end of the sleeve bushing by a press fit.

Rotatably mounted in the sleeve bushing and extending beyond each end thereof is a shaft 33 which is, in the present instance, the driven shaft on which the crank assembly is mounted. In its upper side, the sleeve bushing 32 has a port 34 communicating with the passage 31 from the reservoir. If desired, the reservoir may be packed with a lubricant absorbent material, and a wick 35 or the like may extend through the port 34 into wiping engagement with the shaft 33. One or more longitudinal lubricant grooves 36 may be formed in the bushing 32.

The outer end of the shaft 33 has an axial bore 37 therein to receive the end of a driving shaft 38 and its external end is preferably serrated (not shown) and a collar 39 is press fitted thereon. The collar affords adequate support for a set screw 40 which extends through the collar and driven shaft 33 into engagement with a flat surface 41 on the end of the driving shaft 38. Preferably, the collar 39 terminates adjacent to the outer end of the sleeve 32 and end wall 26 of the second member 23 and has a groove 39ª therein to prevent movement of lubricant outwardly along the collar.

As indicated at 42, the outer wall 25 of the second member 23 extends beyond the end wall 26 in the manner of the extension 21 on the inner member 17. Annular rings 43 fixed in grooves 44 in the ends of the extensions 21 and 42 by upsetting marginal portions of the extensions extend radially inwardly and form the outer walls of channels 45 for trapping such oil as may escape from the bearing along the shaft 33. The end walls 20 and 26 have passages 46 at the lower part of the bearing for returning lubricant from the channels 45 into the reservoir 30.

The crank assembly 16 on the inner end of the driven shaft 33 includes a crank 47 on the inner end of the shaft 33. The crank is preferably a die cast element and the union between it and the shaft 33 is also effected by casting the crank about the end of the shaft. The roughened or knurled end of the shaft is indicated at 33ª (Fig. 1). The crank has a recess 48 therein eccentrically disposed with respect to the axis of rotation of the crank and an antifriction element, such as the ball bearing 49, is seated in the recess by a press fit between the outer race of the bearing and the crank and by upset portions of the crank. A crank pin 50 is die cast integrally with the lower end of the connecting rod 15 in the manner previously described and is assembled within the inner race of the bearing by a press fit. If desired, spacing rings 51 may be provided between the connecting rod and the bearing 49 and between the crank and the sleeve 32. The collar 39 and the crank 47 restrain the shafts against endwise travel in the sleeve.

It will be evident from the foregoing that a simple rotary shaft and bearing assembly has been provided which is inexpensive, since a number of the parts are comparatively simple die castings. Moreover initial assemblies of the sleeve bushing 32 with its support (wall 18), the crank with the shaft 33 and the crank 47 pin 51 with the connecting rod 15 are effected in the process of die casting the casing, the crank and the connecting rod. Subsequent assembly is a relatively simple matter of press fitting the several parts together. In operation rotation of the driving shaft 38 will rotate the shaft 33 to move the crank pin 51 through its circular path, thereby reciprocating the connecting rod 15. The upward and downward movements of the diaphragm 13 resulting from the reciprocation of the connecting rod are, as is well understood, the compression and intake strokes, respectively, of the compressor. During operation of the device the bearing surfaces are adequately lubricated by the lubricant which passes from the chamber 30 through passage 31, port 34 and grooves 36.

While the invention is susceptible of various modifications and alternative constructions, we have shown in the drawing and described in detail the preferred embodiment, but it is to be understood that we do not thereby intend to limit the invention to the specific form disclosed, but intend to cover all modifications and alternative constructions falling within the spirit and scope of the invention as expressed in the appended claims.

We claim as our invention:

1. In a bearing structure of the character described, the combination of a pair of annular die cast members arranged to be secured together in coaxial end-to-end relation, each of said members including radially spaced inner and outer walls and a connecting end wall defining a channel, means for securing said members together in a complemental relationship in which said channels are opposed and provide a lubricant reservoir, said inner walls being fashioned to define a bore when said members are so joined, and a sleeve in the bore within the inner walls of said members, said sleeve having the inner wall of one of said members die cast thereon and having a press fit with the inner wall of the other of said members, said sleeve and said inner walls having passages for lubricant from said reservoir to a shaft journaled in said sleeve.

2. In a bearing structure of the character described, the combination of a pair of annular die cast members secured in end-to-end abutting coaxial relation, and a sleeve bearing substantially coextensive with said members, said bearing having one of said members die cast integrally thereon and having a driven fit within the other of said members.

3. In a rotary shaft and bearing assembly of the character described, the combination of an annular die cast support, a bearing sleeve secured within said annular support, a rotatable member journaled in said sleeve and having a collar press fitted on one end thereof beyond one end of said sleeve and the adjacent outer face of said support, said rotatable member having an axial bore in the collar supporting end thereof, a second rotatable member extending into said bore, and readily accessible means mounted on said collar for securing said rotatable members together, said die cast support having an internal lubricant chamber in communication with the first mentioned rotatable member.

4. In a bearing structure of the character described, a pair of coaxially arranged annular die cast members each having inner and outer radially spaced walls and an end wall joining said spaced walls, said walls defining in each member a channel opening toward the channel in the companion member and cooperating to form a lubricant reservoir, one of said members having an internal groove in the edge of its outer wall and the other of said members having the edge of its outer wall fitting within said groove, and means permanently connecting said outer wall edges together, said inner walls providing a space between their edges forming a passageway from the reservoir chamber.

WILLIAM R. BROWN.
NIGEL J. COLLINGS.